United States Patent
Jaquette

(10) Patent No.: US 11,601,257 B2
(45) Date of Patent: Mar. 7, 2023

(54) CREATING DETERMINISTIC CIPHERTEXT USING WIDE-BLOCK ENCRYPTION

(71) Applicant: International Business Machines Corporation, Armonk, NY (US)

(72) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/112,679

(22) Filed: Dec. 4, 2020

(65) Prior Publication Data

US 2022/0182219 A1 Jun. 9, 2022

(51) Int. Cl.
*H04L 29/06* (2006.01)
*H04L 9/06* (2006.01)

(52) U.S. Cl.
CPC ............ *H04L 9/0637* (2013.01); *H04L 9/065* (2013.01); *H04L 9/0625* (2013.01); *H04L 2209/24* (2013.01); *H04L 2209/30* (2013.01)

(58) Field of Classification Search
None
See application file for complete search history.

(56) References Cited

U.S. PATENT DOCUMENTS

| | | | | |
|---|---|---|---|---|
| 4,467,354 A | * | 8/1984 | Eby, Jr. | H04N 1/4105 382/245 |
| 7,827,408 B1 | * | 11/2010 | Gehringer | H04L 9/0643 380/259 |
| 9,237,014 B2 | * | 1/2016 | Leung | H04L 9/065 |
| 9,930,099 B2 | | 3/2018 | McCanne et al. | |
| 10,459,801 B2 | | 10/2019 | Bangalore et al. | |
| 10,489,249 B2 | | 11/2019 | Bangalore et al. | |
| 10,514,986 B2 | | 12/2019 | Bangalore et al. | |
| 2003/0074319 A1 | * | 4/2003 | Jaquette | G06F 21/805 380/22 |
| 2007/0101412 A1 | * | 5/2007 | Yang | G06F 21/305 726/5 |
| 2010/0199042 A1 | * | 8/2010 | Bates | H04L 9/0625 711/135 |
| 2011/0103580 A1 | * | 5/2011 | Hazay | H04L 9/32 707/802 |
| 2013/0198509 A1 | * | 8/2013 | Buruganahalli | H04L 63/1408 713/151 |
| 2015/0379276 A1 | * | 12/2015 | Glickman | G06F 21/78 713/193 |
| 2017/0243012 A1 | * | 8/2017 | Karame | H04W 12/03 |

(Continued)

OTHER PUBLICATIONS

IEEE Standards Association, IEEE Standard for Wide-Block Encryption for Shared Storage Media (Mar. 8, 2011), IEEE Computer Society, 91 pages. (Year: 2011).*

(Continued)

*Primary Examiner* — Maung T Lwin
(74) *Attorney, Agent, or Firm* — Zilka-Kotab, P.C.

(57) ABSTRACT

A computer-implemented method according to one embodiment includes compressing an uncompressed instance of data to create a compressed instance of data; encrypting the compressed instance of data utilizing wide-block encryption in response to determining that a size of the compressed instance of data is less than a predetermined threshold; and adding a zero pad to the encrypted compressed instance of data to create a ciphertext string.

18 Claims, 10 Drawing Sheets

(56) References Cited

U.S. PATENT DOCUMENTS

2019/0215155 A1* 7/2019 Wang ................ H04L 9/0861
2020/0366895 A1* 11/2020 De Luxán Hernández et al. ........
                                                                                         H04N 19/11

OTHER PUBLICATIONS

Wei et al., "MAD2: A Scalable High-Throughput Exact Deduplication Approach for Network Backup Services," IEEE, May 2010, 15 pages.

Anonymous, "A method for fast integer format preserving encryption for large integers," ip.com Prior Art Database, Technical Disclosure No. IPCOM000245153D, Feb. 14, 2016, 4 pages.

Anonymous, "Method to avoid re-encryption of data in deduplication enabled storage controllers," ip.com Prior Art Database, Technical Disclosure No. IPCOM000260404D, Nov. 19, 2019, 6 pages.

Anonymous, "Instance based format preserving encryption and tokenization," ip.com Prior Art Database, Technical Disclosure No. IPCOM000244284D, Nov. 30, 2015, 7 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

IEEE, "IEEE 1619.2-2010—IEEE Standard for Wide-Block Encryption for Shared Storage Media," IEEE Standards Association, 2020, retrieved from https://standards.ieee.org/standard/1619_2-2010.html.

\* cited by examiner

CREATING DETERMINISTIC CIPHERTEXT USING WIDE-BLOCK ENCRYPTION

BACKGROUND

The present invention relates to data encryption, and more particularly, this invention relates to implementing deterministic encryption of data that facilitates data deduplication.

Deterministic encryption is useful in data storage in that it allows duplicates of encrypted data to be identified and removed within such data storage. Deterministic encryption may be combined with length preserving compression (LPC) to enable a storage system to perform data deduplication of data that was already persistently encrypted at a host. However, current implementations require concatenating an initialization vector to encrypted compressed data to generate a ciphertext string. If the data cannot be compressed, current methods may not implement deterministic encryption to encrypt the uncompressed data when generating the ciphertext string.

BRIEF SUMMARY

A computer-implemented method according to one embodiment includes compressing an uncompressed instance of data to create a compressed instance of data; encrypting the compressed instance of data utilizing wide-block encryption in response to determining that a size of the compressed instance of data is less than a predetermined threshold; and adding a zero pad to the encrypted compressed instance of data to create a ciphertext string.

According to another embodiment, a computer-implemented method includes determining that a size of a compressed instance of data is greater than a predetermined threshold; and encrypting an uncompressed instance of data utilizing wide-block encryption, without first compressing the uncompressed instance of data, to create a ciphertext string.

According to another embodiment, a computer-implemented method includes compressing an uncompressed instance of data to create a compressed instance of data; in response to determining that a size of the compressed instance of data is smaller than a predetermined threshold, encrypting the compressed instance of data, utilizing wide-block encryption, and adding a zero pad to the encrypted compressed instance of data to create a formatted string; in response to determining that the size of the compressed instance of data is greater than the predetermined threshold, abandoning or deleting the compressed instance of data, and encrypting the uncompressed instance of data utilizing wide block encryption to create the formatted string.

Other aspects and embodiments of the present invention will become apparent from the following detailed description, which, when taken in conjunction with the drawings, illustrate by way of example the principles of the invention.

DETAILED DESCRIPTION

Figure 1:
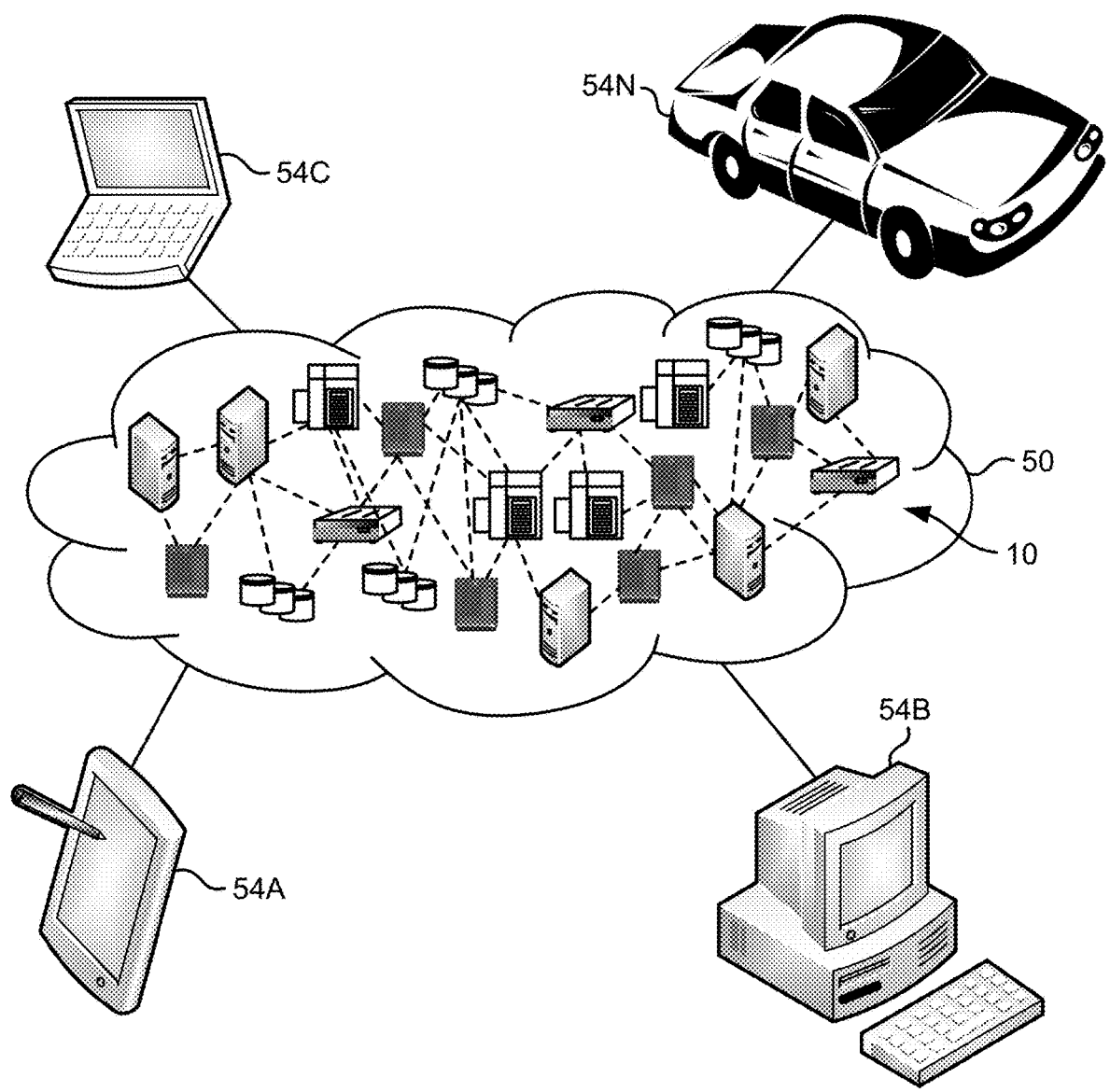
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of creating deterministic ciphertext using wide-block encryption.

In one general embodiment, a computer-implemented method includes compressing an uncompressed instance of data to create a compressed instance of data; encrypting the compressed instance of data utilizing wide-block encryption in response to determining that a size of the compressed instance of data is less than a predetermined threshold; and adding a zero pad to the encrypted compressed instance of data to create a ciphertext string.

In another general embodiment, a computer-implemented method includes determining that a size of a compressed instance of data is greater than a predetermined threshold; and encrypting an uncompressed instance of data utilizing wide-block encryption, without first compressing the uncompressed instance of data, to create a ciphertext string.

In another general embodiment, a computer-implemented method includes compressing an uncompressed instance of data to create a compressed instance of data; in response to determining that a size of the compressed instance of data is smaller than a predetermined threshold, encrypting the compressed instance of data, utilizing wide-block encryption, and adding a zero pad to the encrypted compressed instance of data to create a formatted string; in response to determining that the size of the compressed instance of data is greater than the predetermined threshold, abandoning or deleting the compressed instance of data, and encrypting the uncompressed instance of data utilizing wide block encryption to create the formatted string.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
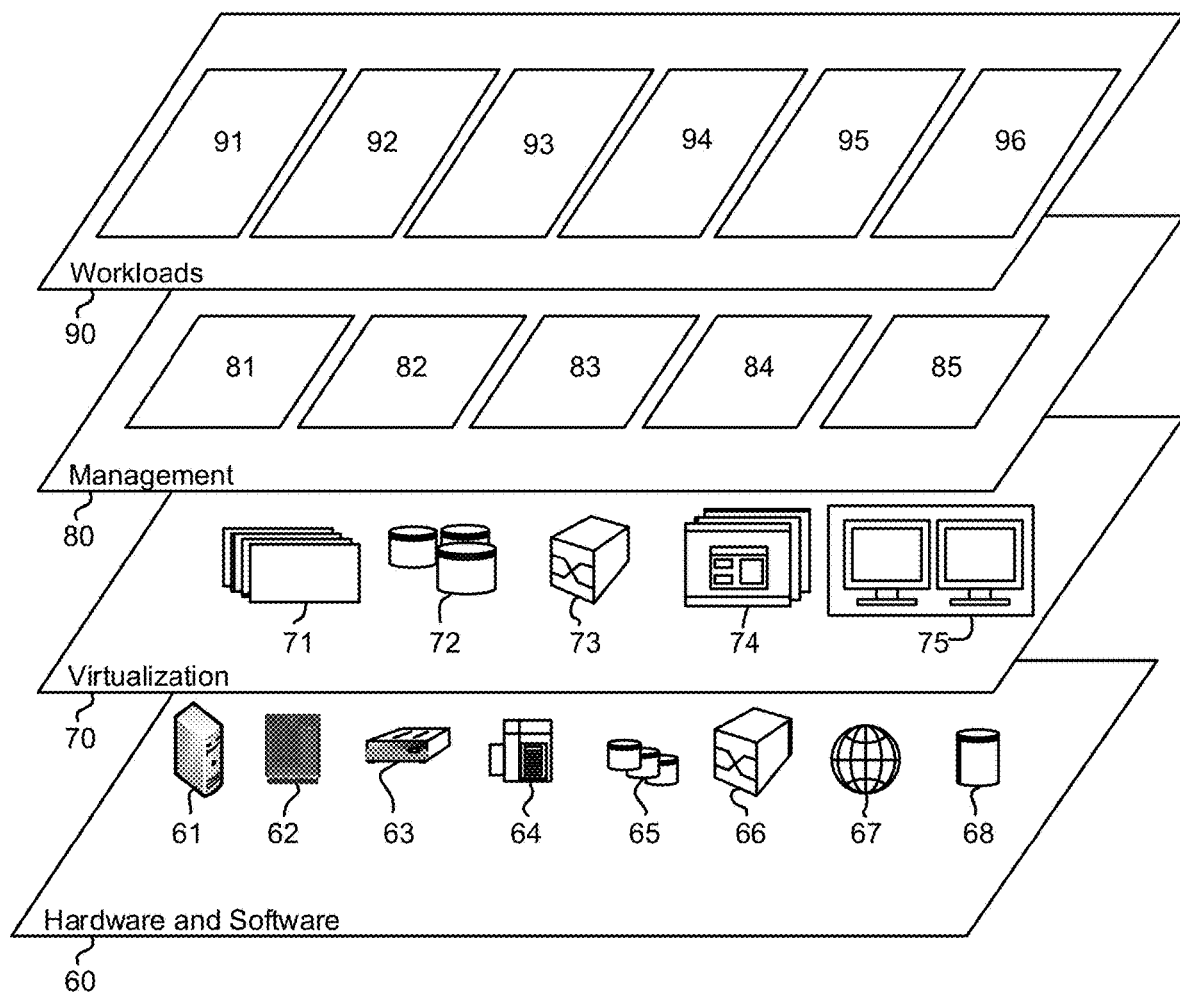
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption 96.

Figure 3:
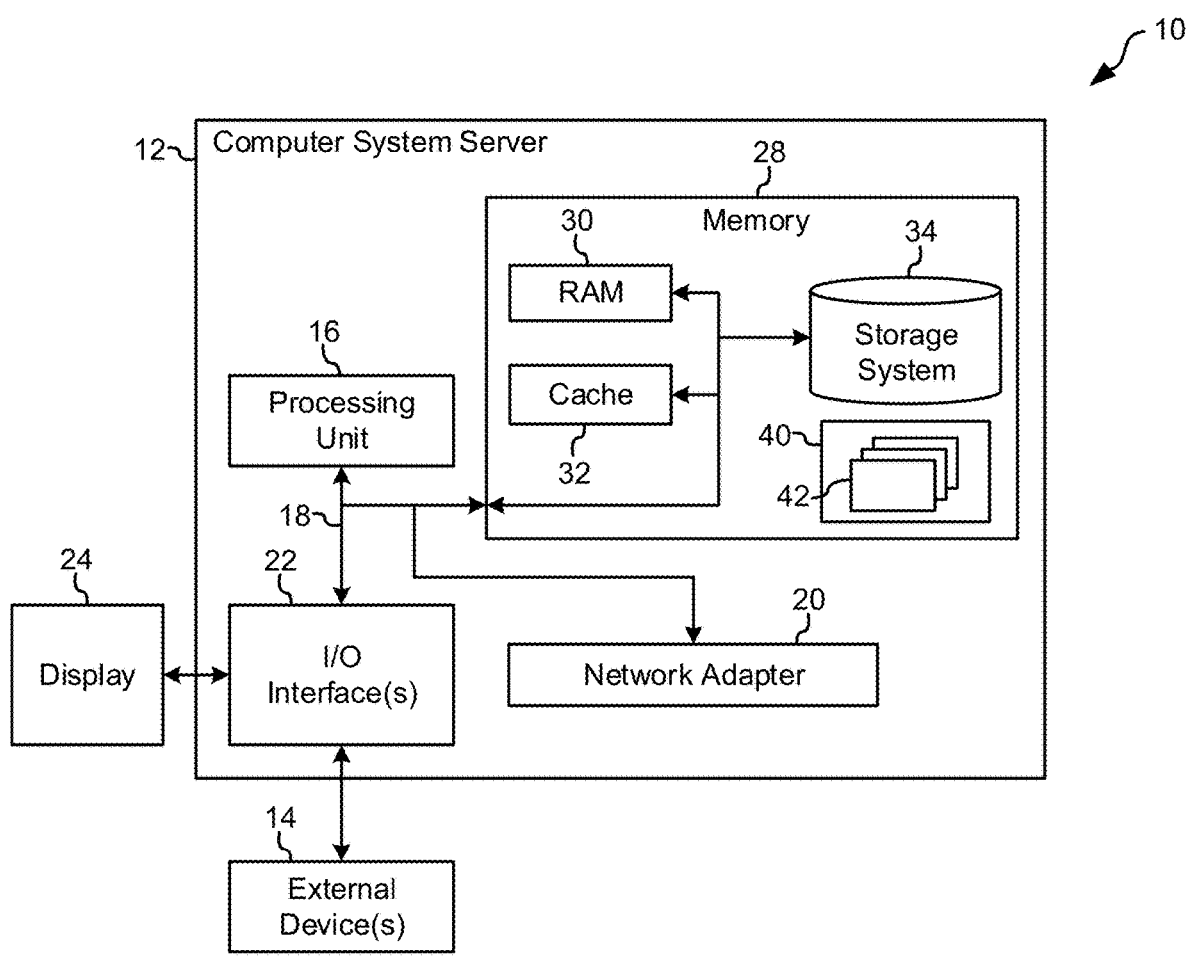
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
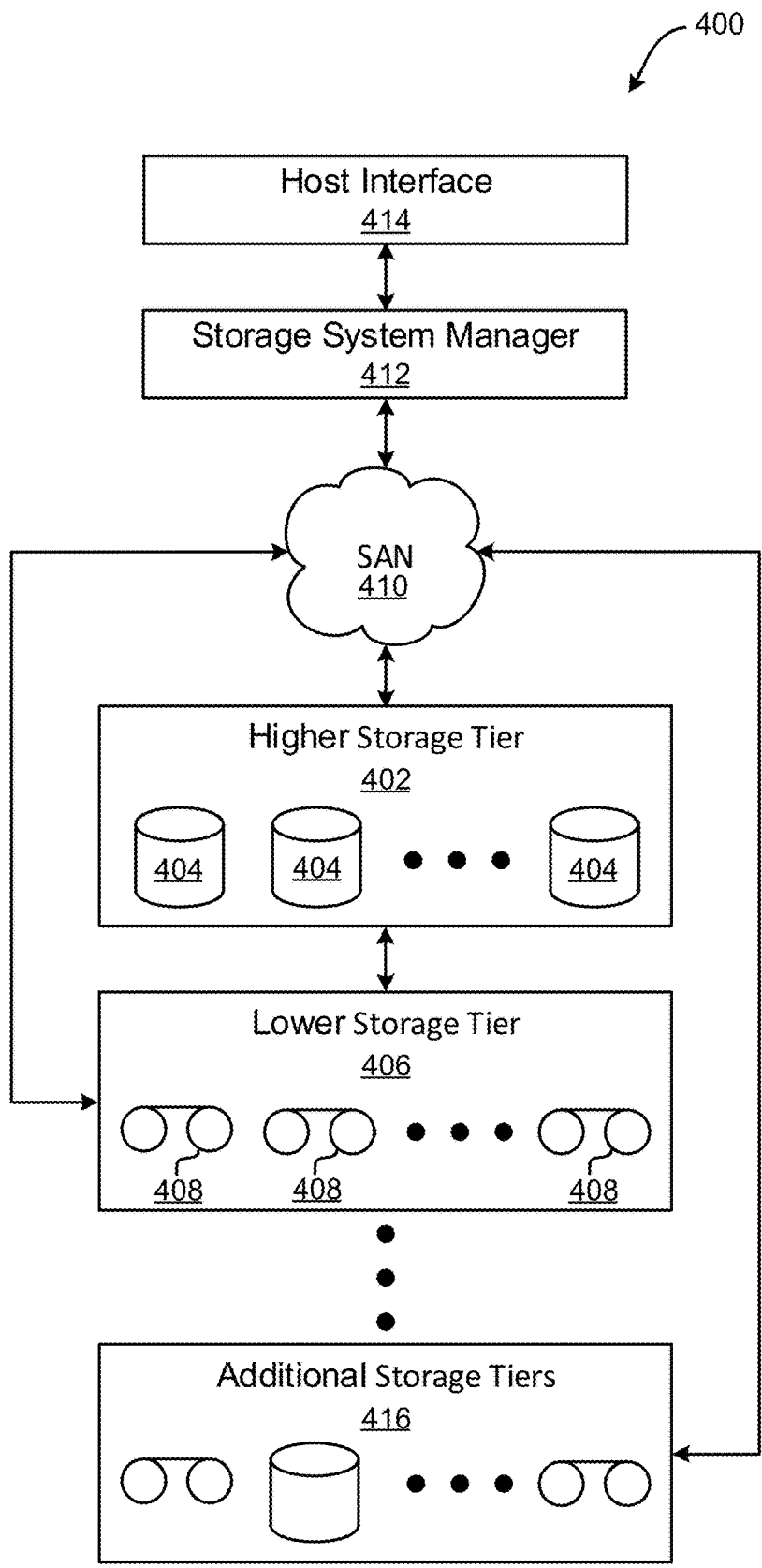
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
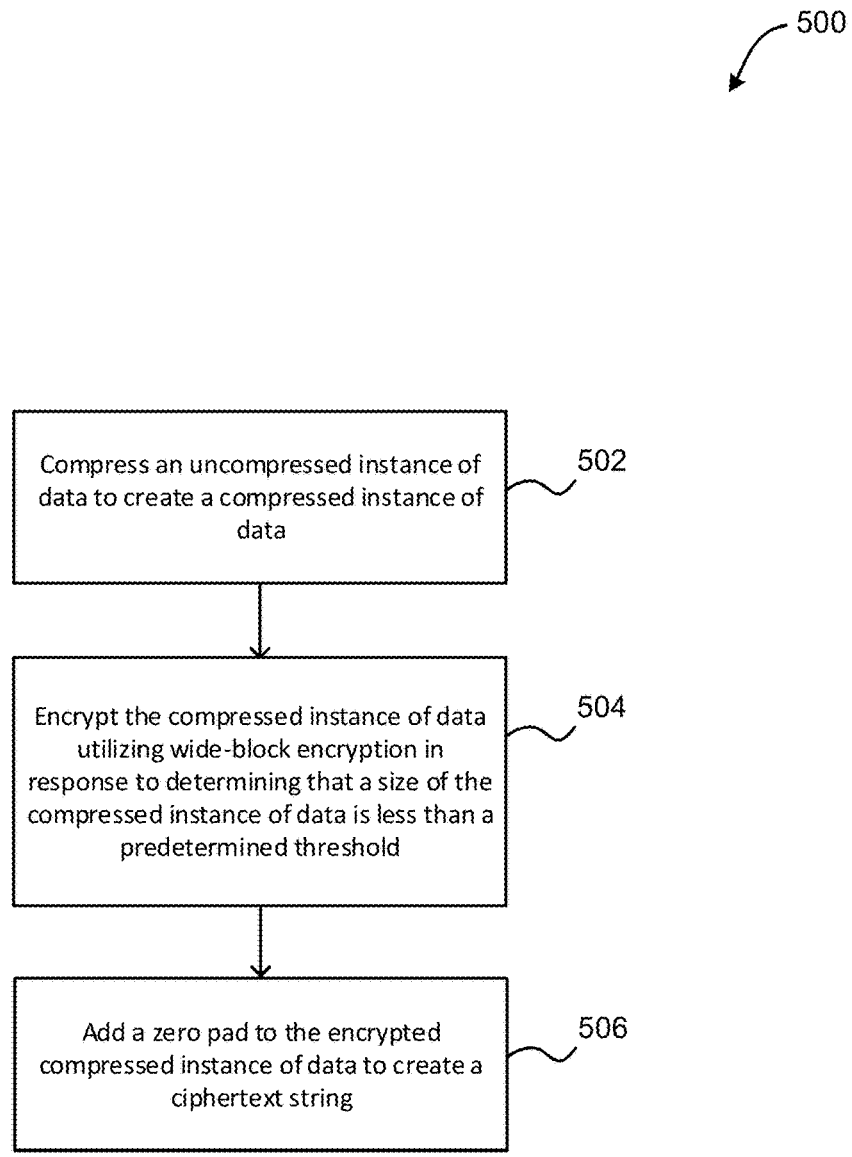
FIG. 5 illustrates a flowchart of a method for creating deterministic ciphertext using wide-block encryption, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 9-10, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 5, method 500 may initiate with operation 502, where an uncompressed instance of data is compressed to create a compressed instance of data. In one embodiment, the uncompressed instance of data may be compressed utilizing one or more compression algorithms to create the compressed instance of data. For example, a compression algorithm may be applied to the uncompressed instance of data to create the compressed instance of data.

Additionally, in one embodiment, the uncompressed instance of data may include data identified to be encrypted. For example, a request to encrypt the uncompressed instance of data may be received from an application, from a user, etc. In another embodiment, the uncompressed instance of data may include an instance of plaintext.

Further, method 500 may proceed with operation 504, where the compressed instance of data is encrypted utilizing wide-block encryption in response to determining that a size of the compressed instance of data is less than a predetermined threshold. In one embodiment, the size of the compressed instance of data may be determined and compared to a predetermined threshold data size.

Further still, in one embodiment, the compressed instance of data may be abandoned or removed in response to determining that the size of the compressed instance of data is greater than the predetermined threshold. For example, the compressed instance of data may be abandoned and overwritten by a future compression engine output. The abandoned data may then be deleted in response to a determination that no further data is coming in or that a loss of power has been detected or is imminent. In another embodiment, the predetermined threshold may include the sum of the length field and a predetermined minimum zero pad amount.

Also, in one embodiment, encrypting the instance of data may result in an encrypted compressed instance of data. In another embodiment, encrypting the compressed instance of data utilizing wide-block encryption may include applying a wide-block encryption algorithm to the compressed instance of data. In yet another embodiment, the wide-block encryption algorithm may include an EME2-AES encryption algorithm, an XCB-AES encryption algorithm, etc.

In addition, in one embodiment, the wide-block encryption algorithm may behave as a single block cipher with a large unencrypted (plaintext) input and a large encrypted (ciphertext) output, but may use a narrow block cipher such as Advanced Encryption Standard (AES) internally. In another embodiment, the wide-block encryption algorithm may take the compressed instance of data as input. In yet another embodiment, a wide-block encryption algorithm may encrypt a larger portion of data (e.g., an entire sector, etc.) when compared to narrow-block encryption algorithms.

In still another embodiment, the wide-block encryption algorithm may output the encrypted compressed instance of data. In still another embodiment, the encrypted compressed instance of data may include an instance of ciphertext (e.g., encrypted text resulting from applying an encryption algorithm to a compressed instance of plaintext, etc.).

Furthermore, method 500 may proceed with operation 506, where zero pad is added to the encrypted compressed instance of data to create a ciphertext string. In one embodiment, a length field may also be added to the encrypted compressed instance of data, where the length field may include a field having a predetermined length (e.g., two bytes, etc.) that indicates a length of the encrypted compressed instance of data. In another embodiment, a length of the encrypted compressed instance of data may be determined, and the length may be encoded into the length field and prepended or appended to the encrypted compressed instance of data. In another embodiment, the size of the length field may be calculated based on a size of the encrypted compressed instance of data.

Further still, in one embodiment, the zero pad may include a predetermined minimum number of bytes with a highly compressible and easily detectable pattern such as all bytes written with zeroes. In another embodiment, the zero pad may have a length greater than a predetermined threshold. For example, the zero pad may include a variable number of bytes, with a minimum length.

Also, in one embodiment, the zero pad may be prepended or appended to the encrypted compressed instance of data, to the length field, etc. In another embodiment, a length of the length field may be subtracted from a length of the uncompressed instance of data (in bytes) to determine a length of the zero pad. In yet another embodiment, a length of the length field, the encrypted compressed instance of data, and the zero pad may equal a length of the uncompressed instance of data, adjusting the length of the zero pad field as necessary to achieve that.

In this way, length preserving compression (LPC) may be implemented while compressing and encrypting the instance of data.

Additionally, in one embodiment, the ciphertext string may be stored and/or transmitted. For example, the ciphertext string may be stored in a database, a distributed storage system, a cloud computing environment, etc. In another example, the ciphertext string may be sent via one or more networks to one or more users, one or more devices, one or more remote storage systems, etc.

Further, in one embodiment, the zero pad may be used to identify the encrypted compressed instance of data (e.g., in response to receiving the encrypted compressed instance of data or reading the encrypted compressed instance of data from storage). For example, upon receipt of the ciphertext string, a receiving entity may search the string for the zero pad (e.g., at a predetermined location within the ciphertext string, etc.). In another example, if the zero pad is identified, the ciphertext string may be identified as an encrypted compressed instance of data. In yet another example, if the zero pad is not identified, the ciphertext string may be identified as an encrypted uncompressed instance of data.

In this way, a fully deterministic ciphertext string may be created and stored for the instance of data. The ciphertext string is fully deterministic in that, using the above wide-block encryption techniques, a first ciphertext string created for a first instance of data using a first key may be identical to a second ciphertext string created for a second instance of data encrypted using a second key if the first instance of data is identical to the second instance of data and the first key is identical to the second key. As a result, duplicate ciphertext strings may be identified within hardware storage and may be removed, thereby increasing available storage space within the hardware storage, and improving the performance of the hardware storage, while maintaining the security of the stored data via robust encryption.

More specifically, since the encrypted compressed instance of data is encrypted using wide-block encryption, security vulnerability is avoided. Also, by utilizing wide-block encryption to encrypt the compressed instance of data, the need to create and include an initialization vector with the ciphertext string may be avoided, which may reduce an amount of processing necessary to create the ciphertext string, thereby improving the format efficiency of a computing device that creates the ciphertext string and so reduces the amount of storage space required, potentially increasing the effective storage capacity of the storage device.

Figure 6:
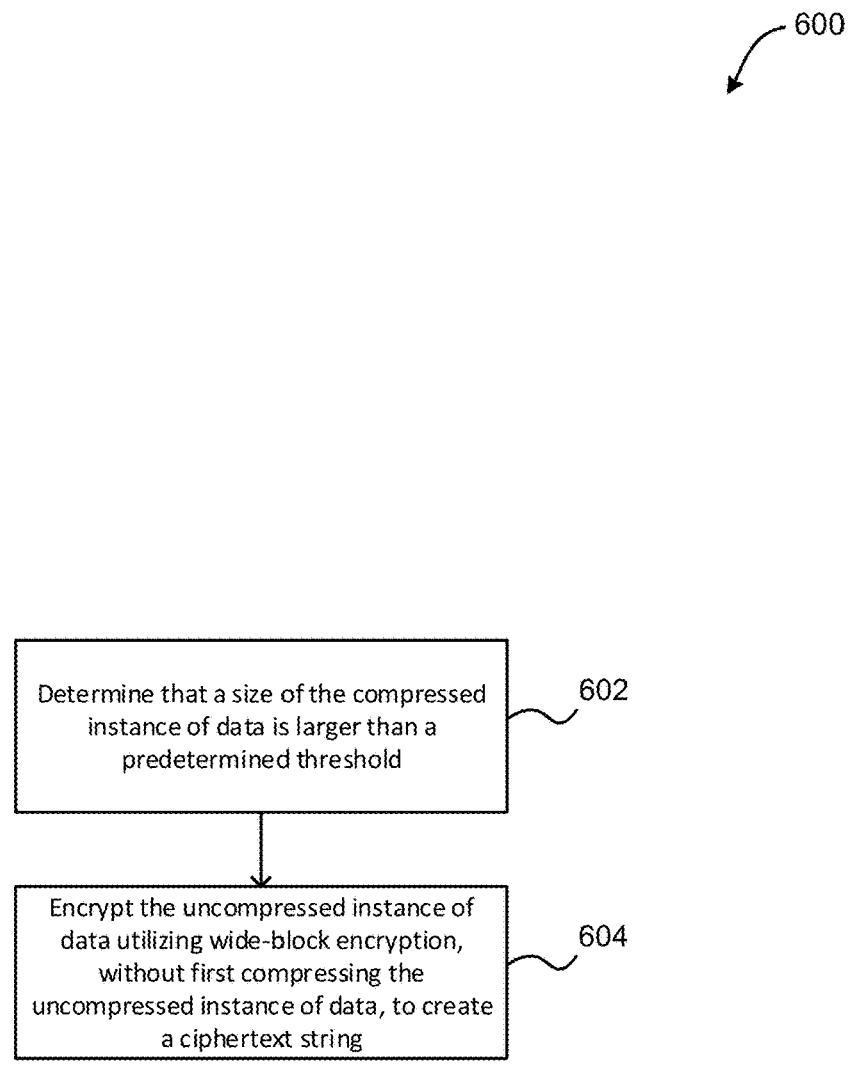
FIG. 6 illustrates a flowchart of a method for encrypting an uncompressed instance of data utilizing wide-block encryption, in accordance with one embodiment of the present invention.

Now referring to FIG. 6, a flowchart of a method 600 for encrypting an uncompressed instance of data utilizing wide-block encryption is shown according to one embodiment. The method 600 may be performed in accordance with the present invention in any of the environments depicted in FIGS. 1-4 and 9-10, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 6, method 600 may initiate with operation 602, where it is determined that a size of the compressed instance of data is larger than a predetermined threshold. In one embodiment, the uncompressed instance of data may include data identified to be encrypted. For example, a request to encrypt the uncompressed instance of data may be received from an application, from a user, etc.

Additionally, in one embodiment, the uncompressed instance of data may include an instance of plaintext. For example, plaintext may include unencrypted information that desired to be encrypted via one or more encryption algorithms. In another embodiment, the uncompressed instance of data may be compressed utilizing one or more compression algorithms to create the compressed instance of data.

Further, in one embodiment, the size of the compressed instance of data may be compared to a predetermined threshold. In another embodiment, the predetermined threshold may include a threshold data size. In yet another embodiment, the predetermined threshold may include a size of the sum of a length field and a predetermined zero pad amount. In still another embodiment, the compressed instance of data may be abandoned (e.g., removed, deleted, etc.) in response to determining that the size of the compressed instance of data is greater than the predetermined threshold.

Further still, method 600 may proceed with operation 604, where the uncompressed instance of data is encrypted utilizing wide-block encryption, without first compressing the uncompressed instance of data, to create a ciphertext string. In one embodiment, encrypting the uncompressed instance of data may result in an encrypted uncompressed instance of data. In another embodiment, the encrypted uncompressed instance of data may have the same size/length as the uncompressed instance of data.

Also, in one embodiment, encrypting the uncompressed instance of data utilizing wide-block encryption may include applying a wide-block encryption algorithm to the uncompressed instance of data. In another embodiment, the wide-block encryption algorithm may include an EME2-AES encryption algorithm, an XCB-AES encryption algorithm, etc. In yet another embodiment, the wide-block encryption algorithm may behave as a single block cipher, and may take the uncompressed instance of data as input.

In addition, in one embodiment, the wide-block encryption algorithm may use a narrow block cipher (e.g., an advanced encryption standard (AES) cipher) internally while encrypting the uncompressed instance of data. In another embodiment, the wide-block encryption algorithm may output the encrypted uncompressed instance of data. In yet another embodiment, the encrypted uncompressed instance of data may include an instance of ciphertext (e.g., encrypted text resulting from applying an encryption algorithm to an uncompressed instance of plaintext, etc.).

Furthermore, in one embodiment, the ciphertext string may be stored and/or transmitted. For example, the ciphertext string may be stored in a database, a distributed storage system, a cloud computing environment, etc. In another example, ciphertext string may be sent via one or more networks to one or more users, one or more devices, one or more remote storage systems, etc.

In this way, a fully deterministic ciphertext string may be created and stored for the instance of data. The ciphertext string is fully deterministic in that, using the above wide-block encryption techniques, a first ciphertext string created for a first instance of data using a first key may be identical to a second ciphertext string created for a second instance of data using a second key if the first instance of data is identical to the second instance of data and the first key is identical to the second key. As a result, duplicate ciphertext strings may be identified within hardware storage and may be removed, thereby increasing available storage space within the hardware storage, and improving the performance of the hardware storage, while maintaining the security of the stored data via robust encryption.

More specifically, since the encrypted uncompressed instance of data is encrypted using wide-block encryption, security vulnerability is avoided while preserving a length of the original uncompressed instance of data.

Figure 7:
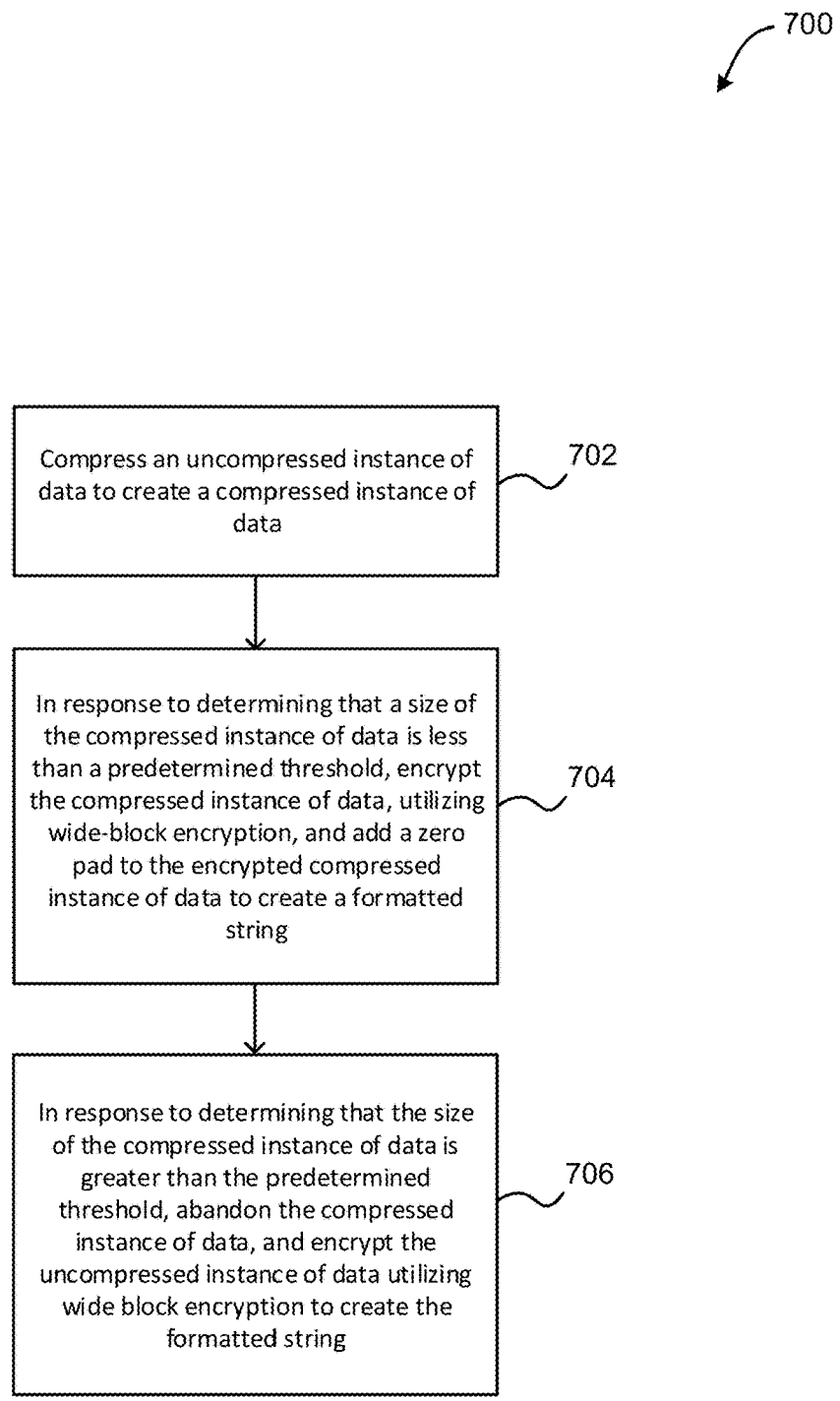
FIG. 7 illustrates a flowchart of a method for encrypting either a compressed or uncompressed instance of data utilizing wide-block encryption, in accordance with one embodiment of the present invention.

Now referring to FIG. 7, a flowchart of a method 700 for encrypting either a compressed or uncompressed instance of data utilizing wide-block encryption is shown according to one embodiment. The method 700 may be performed in accordance with the present invention in any of the environments depicted in FIGS. 1-4 and 9-10, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 7, method 700 may initiate with operation 702, where an uncompressed instance of data is compressed to create a compressed instance of data. Additionally, method 700 may proceed with operation 704, where in response to determining that a size of the compressed instance of data is less than a predetermined threshold, the compressed instance of data is encrypted, utilizing wide-block encryption, and a length field and zero pad are added to the encrypted compressed instance of data to create a formatted string.

Further, method 700 may proceed with operation 706, where in response to determining that the size of the compressed instance of data is greater than the predetermined threshold, the compressed instance of data is abandoned or deleted, and the uncompressed instance of data is encrypted utilizing wide-block encryption to create the formatted string.

Figure 8:
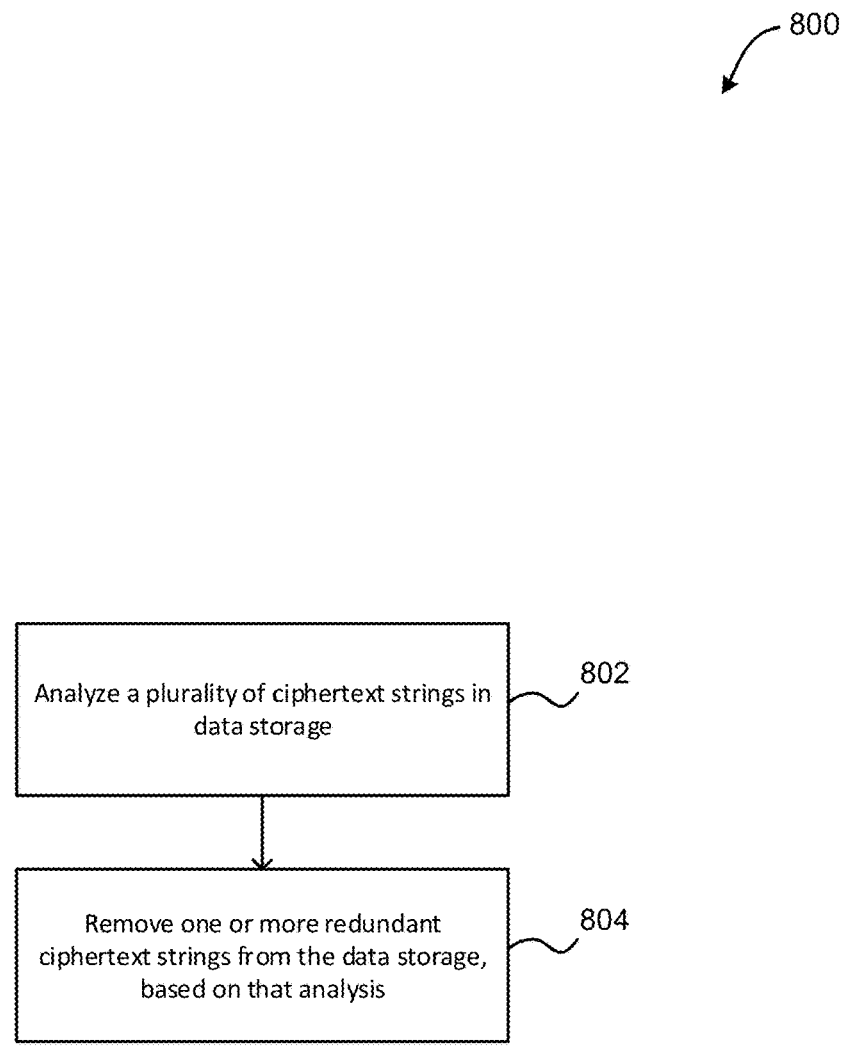
FIG. 8 illustrates a flowchart of a method for performing data deduplication, in accordance with one embodiment of the present invention.

Now referring to FIG. 8, a flowchart of a method 800 for performing data deduplication is shown according to one embodiment. The method 800 may be performed in accordance with the present invention in any of the environments depicted in FIGS. 1-4 and 9-10, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 8, method 800 may initiate with operation 802, where a plurality of ciphertext strings in data storage are analyzed. In one embodiment, the data storage may include a database, a distributed storage system, a cloud computing environment, etc. In another embodiment, the analyzing may include comparing a single ciphertext string within the data storage to other ciphertext strings within the data storage to determine if any matches (e.g., duplicates) exist within the data storage.

In yet another embodiment, one or more of plurality of ciphertext strings may be created by performing wide-block encryption on an uncompressed instance of plaintext to create an encrypted uncompressed instance of plaintext having a length matching a length of the uncompressed instance of plaintext. In still another embodiment, one or more of plurality of ciphertext strings may be created by performing wide-block encryption on a compressed instance of plaintext to create an encrypted compressed instance of plaintext. A length field and variable-length zero pad may be added to the encrypted compressed instance of plaintext to create a ciphertext string having a length matching a length of the uncompressed instance of plaintext.

Further, method 800 may proceed with operation 804, where one or more redundant ciphertext strings are removed from the data storage, based on that analysis. In one embodiment, in response to determining that one or more matches/duplicates are found for a given ciphertext string within the data storage, one or more instances of the given ciphertext string may be removed (e.g., deleted, migrated, etc.) from the data storage. In another embodiment, duplicate ciphertext strings may be removed from the data storage such that a single instance of the ciphertext string remains in the data storage.

As a result, deduplication may be performed within the data storage, which may maximize an amount of available storage space within the data storage, thereby improving a performance of the hardware implementing the data storage.

Figure 9:
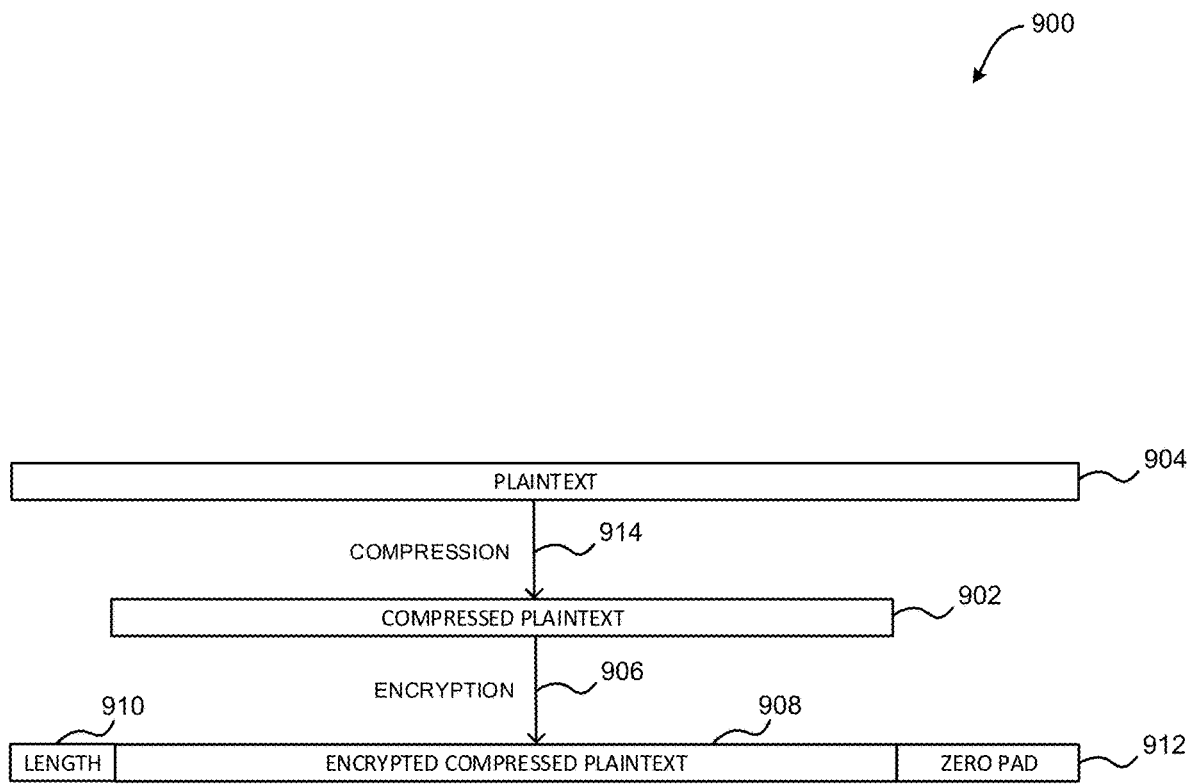
FIG. 9 illustrates an exemplary environment for performing wide-block encryption of a compressed instance of plaintext, in accordance with one embodiment of the present invention.

FIG. 9 illustrates an exemplary environment 900 for performing wide-block encryption 906 of a compressed instance of plaintext 902, according to one exemplary embodiment. As shown, an uncompressed instance of plaintext 904 is received with instructions to encrypt such uncompressed plaintext 904. In response, the uncompressed instance of plaintext 904 is compressed 914 to create the compressed instance of plaintext 902.

Additionally, a size of the compressed instance of plaintext 902 is compared to a predetermined size threshold (e.g., a size of the uncompressed instance of plaintext 904 less a size of the zero pad 912 and a size of a length field 910), and is found to be less than the predetermined size threshold. In response to this determination, wide-block encryption 906 is performed on the compressed instance of plaintext 902 to create an encrypted compressed instance of plaintext 908 having the same size as the compressed instance of plaintext 902.

Further, a length of the compressed instance of plaintext 902 is determined and added as a length field 910 to the encrypted compressed instance of plaintext 908. A zero pad 912 having a variable-length (with predetermined minimum length) is created and appended to the compressed instance of plaintext 902.

In this way, a ciphertext string is created by combining the length field 910, the encrypted compressed instance of plaintext 908, and the zero pad 912. A length of this ciphertext string is the same as the uncompressed instance of plaintext 904, which maintains length-preserving compression (LPC).

Figure 10:
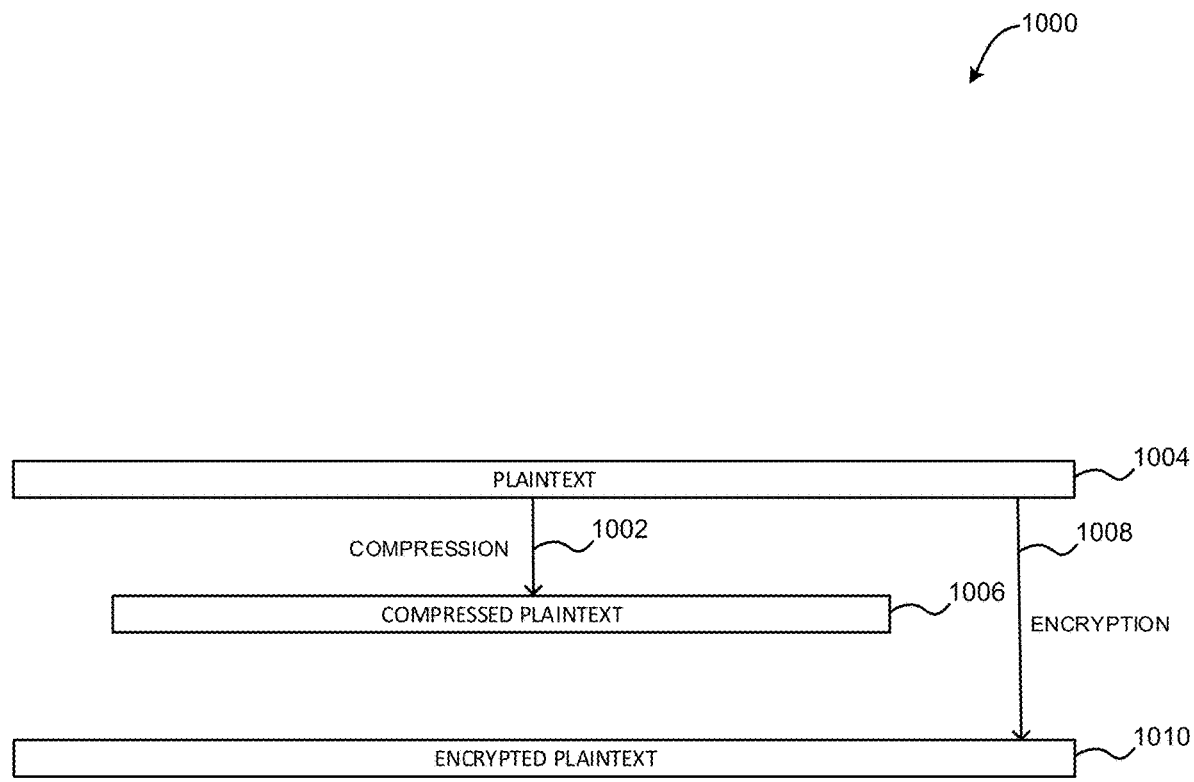
FIG. 10 illustrates an exemplary environment for performing wide-block encryption of an uncompressed instance of plaintext, in accordance with one embodiment of the present invention.

FIG. 10 illustrates an exemplary environment 1000 for performing wide-block encryption 1008 of an uncompressed instance of plaintext 1004, according to one exemplary embodiment. As shown, an uncompressed instance of plaintext 1004 is received with instructions to encrypt such uncompressed plaintext 1004. In response, the uncompressed instance of plaintext 1004 is compressed 1002 to create the compressed instance of plaintext 1006.

Additionally, a size of the compressed instance of plaintext 1006 is compared to a predetermined size threshold, and is found to be greater than the predetermined size threshold. In response to this determination, the compressed instance of plaintext 1006 is discarded and wide-block encryption 1008 is performed on the uncompressed instance of plaintext 1004 to create an encrypted uncompressed instance of plaintext 1010 having the same size as the uncompressed instance of plaintext 1004.

In this way, length-preserving compression (LPC) is maintained, while producing a ciphertext string (the encrypted uncompressed instance of plaintext 1010) using deterministic encryption that enables deduplication.

Enabling Full Deduplication in Either an LPC or Opportunistic Deduplication Solution An opportunistic deduplication solution enables selective data deduplication of data that has been processed by length preserving compression (LPC). More specifically, opportunistic deduplication enables data deduplication, but only of sufficiently compressible data which allows for three fields to be added:

1. A length field (to enable use of cipher stealing), which may be 2 bytes long
2. An initialization vector (to allow convergent encryption), which may be 22 bytes long
3. A zero pad field of adequate length, which may have a minimum length of 14 bytes The above solution assumes that if a given sector (or data deduplication chunk) is insufficiently compressible (and thus does not allow for the minimum lengths of all three of the above fields (without expansion), then the uncompressed data may be encrypted without expansion (e.g., using XTS-AES with the logical block address (LBA)).

This implementation may be extended by using of a wide-block encryption mode (e.g., EME2-AES, XCB-AES, etc.). Additionally, LPC itself may be extended using of a wide-block encryption mode.

For example, if a wide-block encryption mode such as EME2-AES is used (e.g., instead of XTS-AES), then deduplication may be performed on the encrypted version of data which does not compress to the predetermined threshold, i.e., insufficiently compressible data. The present invention extends the opportunistic deduplication algorithm by allowing the deduplication of insufficiently compressible data.

Also, a wide-block encryption mode (such as EME2) may be used to extend LPC itself (e.g., without the opportunistic deduplication extension). More specifically, a wide-block encryption mode may displace the use of XTS-AES and may be used to encrypt both the sufficiently compressible data as well as the insufficiently compressible data.

In one embodiment, a method of deduplication of data is provided, including compressing each unit of data into compressed data, calculating the length of the original unit of data minus the compressed data length, and comparing the result to a predetermined threshold. If the compression succeeds in reducing the length of the compressed data below the predetermined threshold, then the data is determined to be sufficiently compressible and is output it one of two ways, either a first way, or a second way. If the data is not sufficiently compressible, it is output in a third way.

For sufficiently compressible data, the compressed data is encrypted and output along with one or more of the following fields: a length field, an initialization vector (IV) field, and a variable-length zero pad field, where each field has a predefined minimum length.

A first way to encrypt sufficiently compressible data is to use the IV field and to populate that field with a hash (possibly keyed) and use an IV-dependent mode of encryption (such as a CTR, OFB, CFB, or CTR mode of encryption) such that convergent deterministic encryption is achieved.

A second way to encrypt sufficiently compressible data is to encrypt the compressed data with a wide-block encryption mode, such as EME2, and in this case there is no need for an IV field.

Sufficiently compressible data is output into a total length allowing for the encrypted compressed data, a length field, an IV field if required (e.g., the first way), a zero pad field, and, if desired, one or more additional associated metadata field(s), each of a defined minimum length.

In the case of insufficiently compressible data, the third way to encrypt is used. In this case the original uncompressed data is encrypted directly with wide-block encryption such as EME2 which is length preserving such that the resultant ciphertext is the same length as the original cleartext data.

This enables potential data deduplication of all encrypted data output (if there are prior instances of the same cleartext received under the same encryption key), regardless of which of the three ways the data was encrypted.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention. Additional exemplary circuitry includes one or more co-processors or accelerators which may or may not be on the same chip, or packaged on the same substrate or module, as a CPU.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc. Additional exemplary processors include one or more co-processors or accelerators which may or may not be on the same chip, or packaged on the same substrate or module, as the CPU.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    compressing an uncompressed instance of data to create a compressed instance of data;
    encrypting the compressed instance of data utilizing wide-block encryption in response to determining that a size of the compressed instance of data is less than a predetermined threshold;
    adding a zero pad to the encrypted compressed instance of data to create a ciphertext string;
    storing the ciphertext string in data storage having other ciphertext strings stored therein, thereby forming a plurality of stored ciphertext strings; and
    deduplicating the stored ciphertext strings by analyzing the stored ciphertext strings for detecting redundant ciphertext strings, and removing the detected redundant ciphertext strings from the data storage.

2. The computer-implemented method of claim 1, wherein the uncompressed instance of data includes an instance of plaintext.

3. The computer-implemented method of claim 1, wherein the compressed instance of data is abandoned or deleted in response to determining that the size of the compressed instance of data is greater than the predetermined threshold.

4. The computer-implemented method of claim 1, wherein the compressed instance of data is encrypted in response to determining that, a sum of the size of the compressed instance of data, a length field added to the compressed instance of data, and a predetermined minimum zero pad length is less than the predetermined threshold.

5. The computer-implemented method of claim 1, wherein the wide-block encryption includes an Encrypt Mix Encrypt V2 Advanced Encryption Standard (EME2-AES) encryption algorithm.

6. The computer-implemented method of claim 1, wherein the wide-block encryption includes an Extended Codebook Advanced Encryption Standard (XCB-AES) encryption algorithm.

7. The computer-implemented method of claim 1, further comprising adding a length field to the encrypted compressed instance of data, wherein the length field includes a field having a predetermined length that indicates a length of the encrypted compressed instance of data.

8. The computer-implemented method of claim 1, wherein the zero pad includes a variable number of bytes of a highly compressible pattern.

9. The computer-implemented method of claim 1, wherein a length of a length field added to the compressed instance of data, the encrypted compressed instance of data, and the zero pad equals a length of the uncompressed instance of data.

10. The computer-implemented method of claim 1, wherein the data storage is part of a data storage system having multiple storage tiers.

11. The computer-implemented method of claim 10, wherein removing the detected redundant ciphertext strings from the data storage includes migrating the redundant ciphertext strings to a different tier of the data storage system.

12. A computer-implemented method, comprising;
compressing an uncompressed instance of data to create a compressed instance of data;
encrypting the compressed instance of data utilizing wide-block encryption in response to determining that a size of the compressed instance of data is less than a predetermined threshold; and
adding a zero pad to the encrypted compressed instance of data to create a ciphertext string; and
identifying the encrypted compressed instance of data, utilizing the zero pad, in response to receiving the encrypted compressed instance of data or reading the encrypted compressed instance of data from storage.

13. A computer-implemented method, comprising:
determining that a size of a compressed instance of data is greater than a predetermined threshold; and
encrypting an uncompressed instance of the data utilizing wide-block encryption, without first compressing the uncompressed instance of the data, to create a ciphertext string;
storing the ciphertext string in data storage having other ciphertext strings stored therein, thereby forming a plurality of stored ciphertext strings; and
deduplicating the stored ciphertext strings by analyzing the stored ciphertext strings for detecting redundant ciphertext strings, and removing the detected redundant ciphertext strings from the data storage.

14. The computer-implemented method of claim 13, wherein the encrypted uncompressed instance of data has the same length as the uncompressed instance of data.

15. The computer-implemented method of claim 13, wherein the wide-block encryption includes an encryption algorithm selected from the group consisting of: an Encrypt Mix Encrypt V2 Advanced Encryption Standard (EME2-AES) encryption algorithm and an Extended Codebook Advanced Encryption Standard (XCB-AES) encryption algorithm.

16. The computer-implemented method of claim 13, comprising compressing a second instance of data in response to determining that a size of the compressed second instance of data is less than the predetermined threshold; encrypting the second instance of data to create a second ciphertext string; storing the second ciphertext string in the data storage as one of the stored ciphertext strings; and deduplicating the stored ciphertext strings.

17. The computer-implemented method of claim 13, wherein the data storage is part of a data storage system having multiple storage tiers.

18. The computer-implemented method of claim 17, wherein removing the detected redundant ciphertext strings from the data storage includes migrating the redundant ciphertext strings to a different tier of the data storage system.

* * * * *